United States Patent [19]
Karlicek

[11] 4,344,027
[45] Aug. 10, 1982

[54] FREQUENCY REGULATOR FOR SYNCHRONOUS GENERATORS

[76] Inventor: Robert F. Karlicek, 1920 Camino Centroloma, Fullerton, Calif. 92633

[21] Appl. No.: 119,581

[22] Filed: Feb. 7, 1980

[51] Int. Cl.³ .............................................. H02P 9/00
[52] U.S. Cl. ........................................ 322/7; 322/32; 322/95; 322/97
[58] Field of Search ...................... 322/7, 8, 28, 44, 32, 322/95-98, 89-94

[56] References Cited

U.S. PATENT DOCUMENTS

| | | | |
|---|---|---|---|
| 1,959,163 | 5/1934 | Hamilton, Jr. et al. | 290/40 |
| 2,015,556 | 9/1935 | Fountain | 290/40 |
| 2,095,806 | 10/1937 | Frank | 290/40 |
| 3,215,935 | 11/1965 | Mead, Jr. et al. | 322/98 |
| 3,538,391 | 11/1970 | Bensley et al. | 307/41 |
| 3,546,533 | 12/1970 | Lydick | 322/32 |
| 3,705,721 | 12/1972 | Lulay et al. | 322/28 X |
| 4,219,768 | 8/1980 | Gobaud | 322/32 X |

*Primary Examiner*—Robert J. Hickey
*Attorney, Agent, or Firm*—Lyon & Lyon

[57] ABSTRACT

The present invention is directed to a novel frequency regulator which controls a generator output frequency for variations in both the input power to the generator and the power supplied to an uncontrolled external load. The present invention further includes over current and current balance protection devices which are relatively inexpensive to manufacture, which may be encapsulated to provide protection from the operating environment and which respond more quickly than previously known electromechanical devices.

11 Claims, 11 Drawing Figures

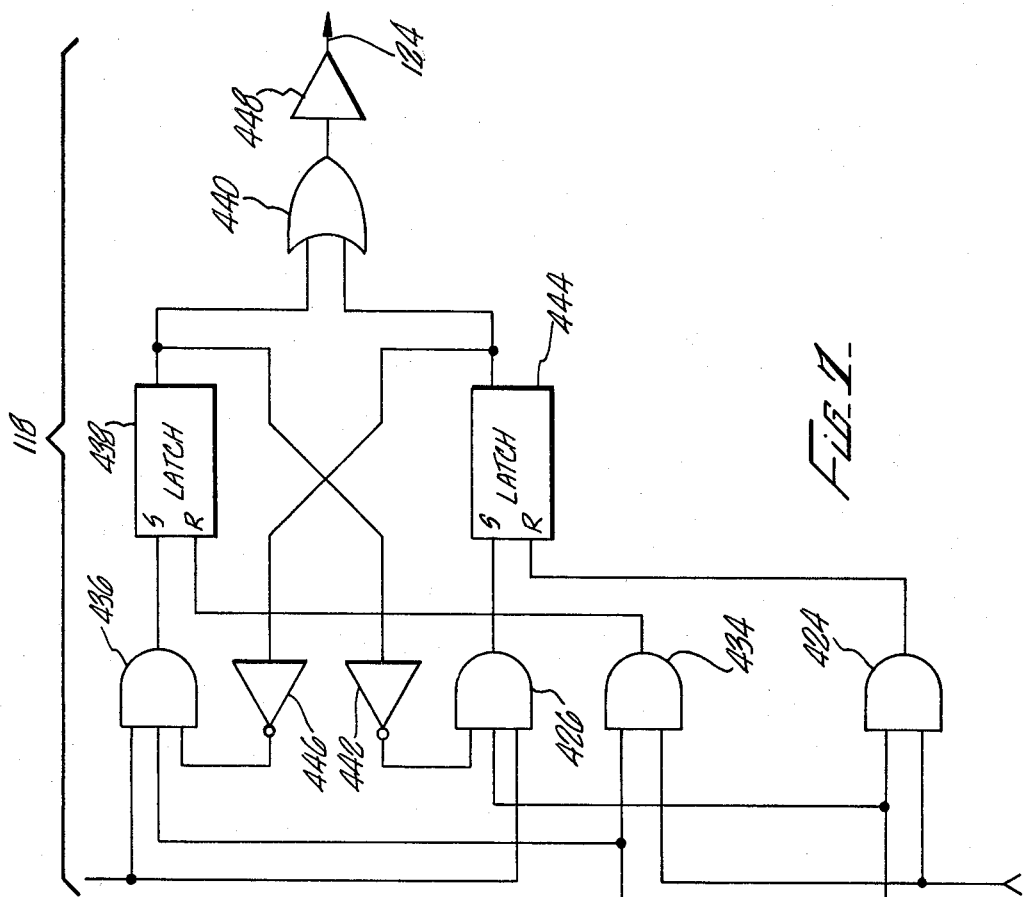
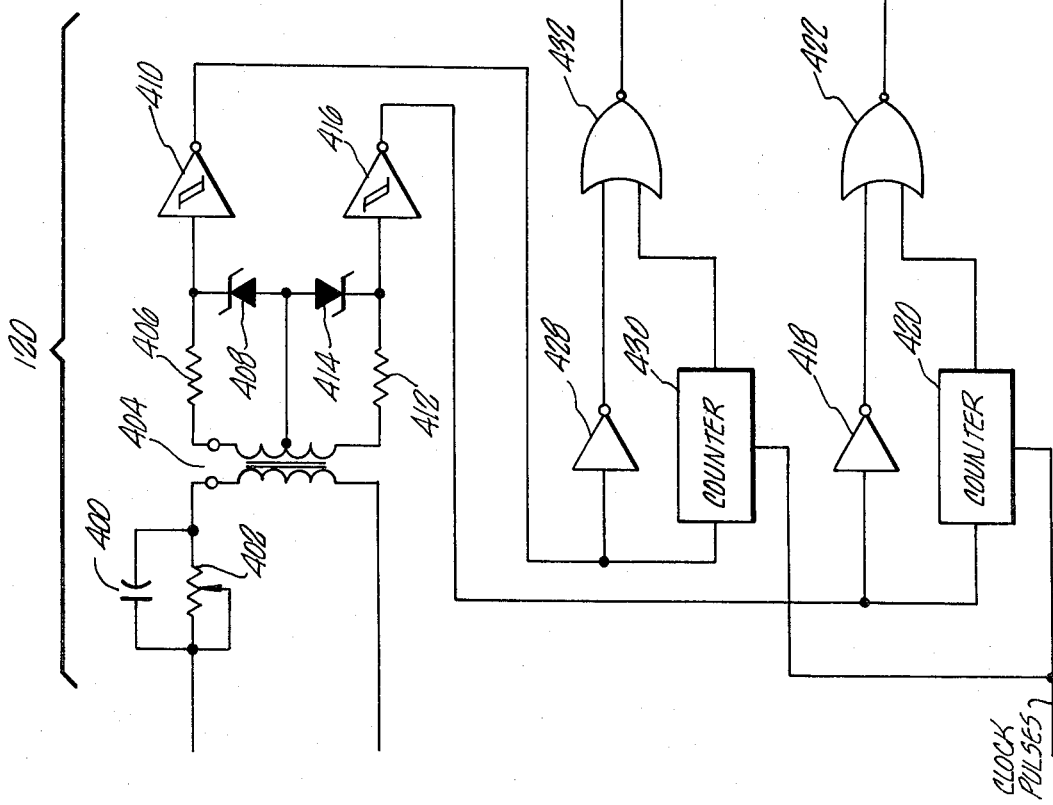
Fig. 7.

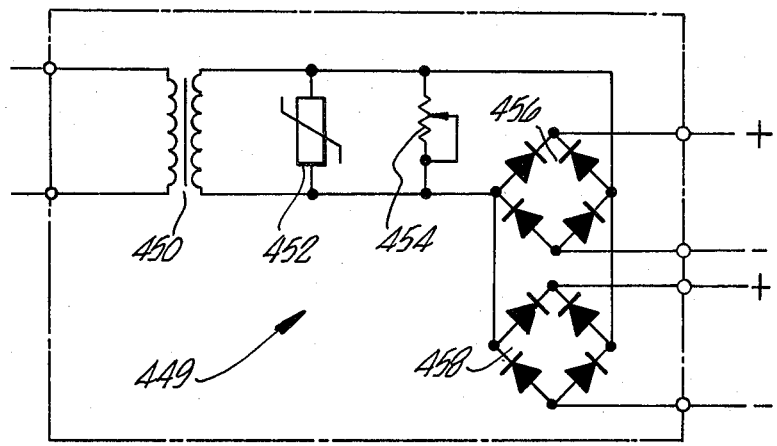
FIG. 8.
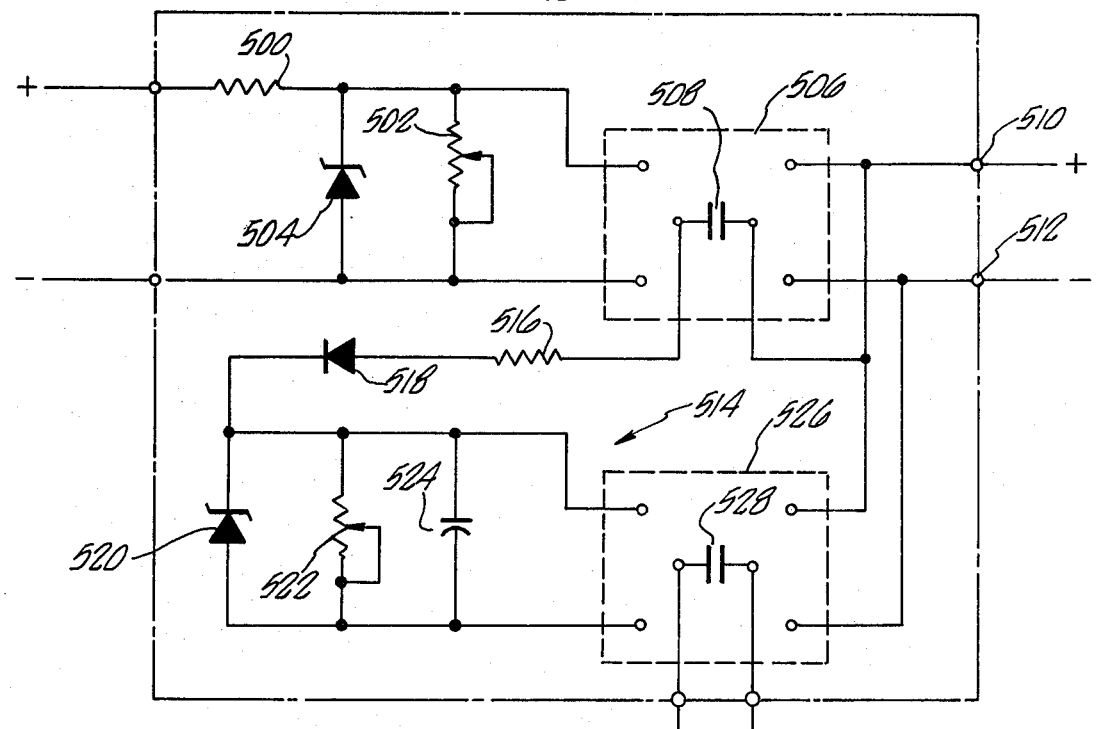
FIG. 9.
FIG. 9A.

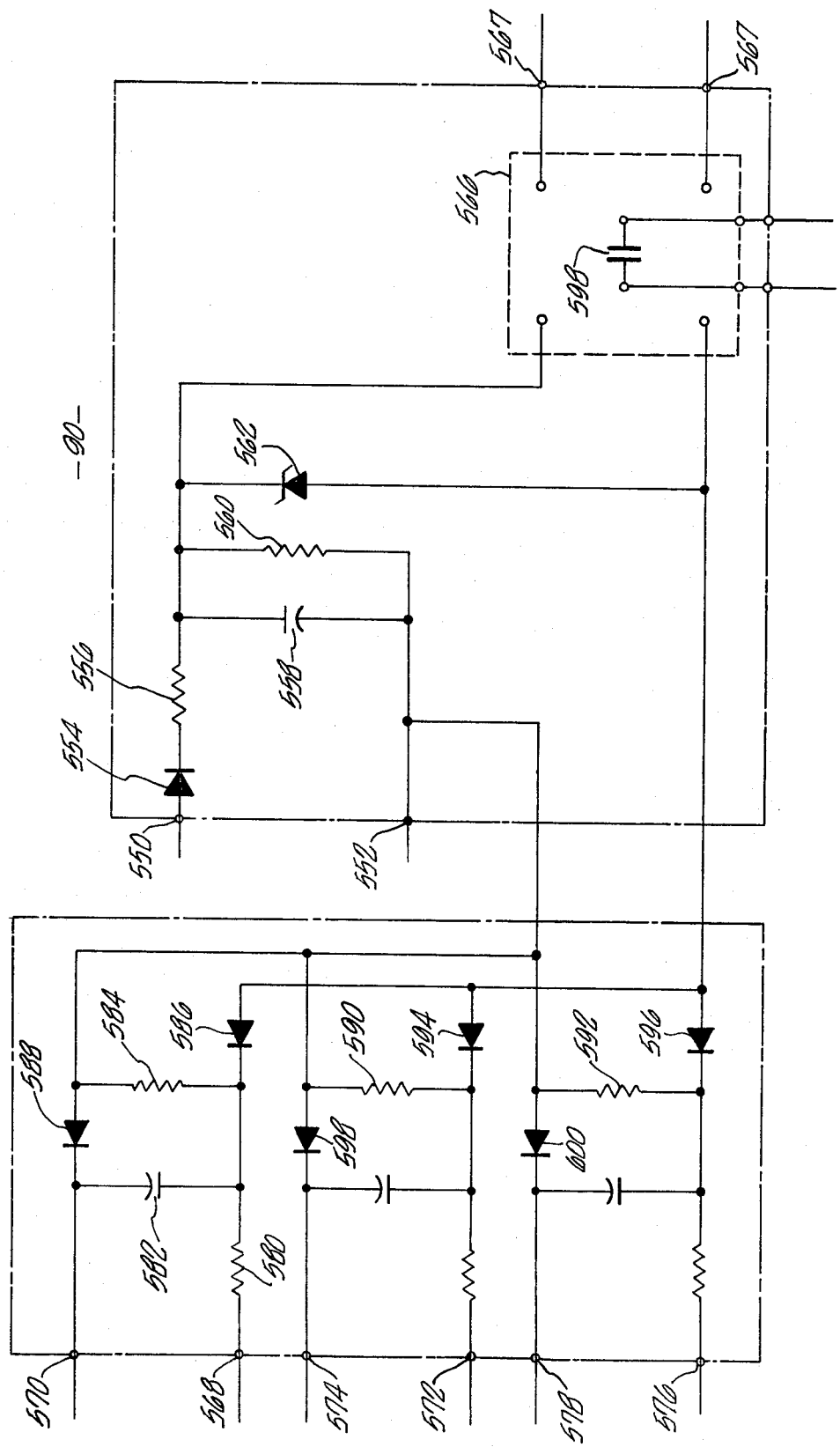

FREQUENCY REGULATOR FOR SYNCHRONOUS GENERATORS

The Government of the United States of America has rights in this invention pursuant to Grant No. DE-FG03-79SF10558 awarded by the Department of Energy.

BACKGROUND OF THE INVENTION

The present invention is directed generally to alternating current power generation and more particularly to frequency regulators and protective devices for alternating current generators.

With increasing interest in energy production, it is desirable to provide a relatively inexpensive and simple electrical power generating apparatus that can be driven from power sources that were previously thought to be unsuitable. For example, and with particular reference to hydroelectric power generation, water flows can be found in mountainous regions or in releases from reservoirs and water supply systems which have relatively low flow rates with heads in the range of two hundred to six hundred feet.

When generating alternating current, the input mechanical power applied to the generator must substantially equal the output electrical power provided by the generator to an electrical load in order to stabilize the frequency of the alternating current. Moreover, this alternating current frequency must be stabilized at a frequency suitable for the particular electrical load connected to the generator which is commonly 60 Hz in the United States.

For example, the water flow rate through the prime mover of a hydroelectric generator can be controlled to thereby control the generator output frequency. This is typically accomplished by means of modulating valves or gates which are adjusted by relatively complicated speed governors. These water flow rate control systems are generally costly and often require continous maintenance. Moreover, sudden changes in the modulating valves or gates can cause undesirable and serious pressure transients in the water supply conduits feeding the prime mover when the water flow rates are suddenly changed. Since the flow rate in the system may be substantially changed or even completely cutoff by the control system, such as system is not practical in applications such as releases from reservoirs in water supply systems as described above.

It is known that for a constant input power to the generator, the frequency of the generator can be maintained at a given value by maintaining a constant load. A local load connected to the generator output is then adjusted to compensate for changes in the remaining electrical load. Such systems are disclosed, for example, in U.S. Pat. Nos. 2,015,556 to Fountain and 3,538,391 to Bensley et al. These systems are constant load systems and thus if the input power varies from the initial constant value, the generator output frequency correspondingly varies. Such systems are therefore not suitable where the power supplied to the generator prime mover can vary as would be the case, for example, with a water supply system where the reservoir water flow release would be changed to respond to demand changes within the water system or in regions where the water level in the reservoir varies. Additionally, systems such as Bensely et al are current regulators and are not true load regulators since the generator output current is not necessarily a true measure of load or power as would occur with, for example, reactive external loads.

Commercially available devices can be used for protecting a generator from over current operation or current imbalance between phases of a polyphase alternating current generator. Typically these devices are electromechanical in nature, are relatively expensive and physically large, respond relatively slowly to changing current conditions in the generator, and require protection from the environment in which the devices operate. It is thus desirable to provide faster, lower cost devices that withstand environmental extremes not suitable for electromechanical devices.

SUMMARY OF THE INVENTION

The present invention is directed to a novel frequency regulator for an alternating current generator apparatus that enables the apparatus to convert uncontrolled variable input mechanical power into an electrical output for an uncontrolled variable external load with a substantially constant output frequency. Thus, unlike prior art devices, the present invention provides a simple, reliable, inexpensive frequency regulator which is adaptable for hydroelectric applications heretofore believed to be uneconomical or unsuitable because of the need for dams or other expensive input control systems or because of uncontrolled variations that can occur in the input power. The present invention also provides generator protection devices that are inexpensive, require less space and are able to operate in environments not suited for electromechanical devices, and which respond more quickly than prior electromechanical devices.

In accordance therewith, a version of the frequency regulator of the present invention includes a frequency transducer that is responsive to the generator output and which provides a signal proportional to the generator output frequency to a voltage level detector and to a zero voltage detector. The voltage level detector provides a plurality of digital outputs according to the generator output frequency and the zero voltage detector provides outputs indicative of zero generator output voltage crossings. Two pulse networks and a reset control provide pulses to a sequential switching control in response to the digital outputs from the voltage level detector. The sequential switching control and a bandwidth control, which is responsive to the voltage level detector and the zero voltage detector, provide control signals to a plurality of switchable local load elements to adjust the power consumed thereby. The load element power consumption is increased if the generator output frequency varies above a predetermined frequency bandwidth range and is decreased if the generator output frequency varies below the bandwidth range. In this way, the present invention maintains the generator output frequency substantially near a nominal center frequency within the bandwidth range. In an exemplary embodiment described herein, the frequency regulator controls the generator output frequency to remain approximately within ±0.3% of the nominal center frequency, although other bandwidth ranges can be implemented.

An over current device according to the present invention includes a plurality of current transducers which together provide a signal substantially proportional to the maximum instantaneous current in the generator. A first high-speed hybrid relay in response to the current transducers provides an output when the instantaneous current exceeds a preset limit. This output is provided to a pulse extender and in turn to a second high-speed hybrid relay. Both hybrid relays are powered from under voltage relays and thus the over current protection device provides an output when over current and under voltage conditions exist.

A current balance protection device according to the present invention also includes a plurality of current transducers which together provide a signal substantially proportional to the maximum instantaneous current in the generator and which individually provide signals proportional to the instantaneous current in each respective generator phase. A current balance detector in response to these signals generates a signal substantially proportional to the maximum peak current and a signal for each generator phase substantially proportional to the peak current in the respective phase. A high-speed hybrid relay compares the maximum peak current signal with each phase peak current signal and generates an output when the maximum peak current exceeds a phase peak current by a predetermined amount which can be proportional to the maximum peak current.

Thus, among the advantages of the present invention, the frequency regulator allows a hydroelectric generating apparatus to be used with uncontrolled water flows and in circumstances that were previously thought to be unsuitable or uneconomical. Furthermore, the protection devices of the present invention are relatively inexpensive, provide response and reset times generally superior to those of previously known electromechanical devices, and can be encapsulated in relatively small modules for easy installation and for protection from the environment.

IN THE DRAWINGS

These and other features, aspects and advantages of the present invention will become better understood with reference to the following description, appended claims, and accompanying drawings where:

FIG. 7 is a schematic diagram of the zero voltage detector and the band width control of the version of FIG. 2.

FIG. 8 is a schematic diagram of a typical current transducer module of FIG. 1.

FIG. 9 is a schematic diagram of the over current sensor of FIG. 1 according to a preferred version of the present invention.

FIG. 9A is a block diagram of the hybrid relay of FIG. 9.

FIG. 10 is a schematic diagram of a preferred embodiment of the current balance detector of FIG. 1.

DETAILED DESCRIPTION OF THE INVENTION

Figure 1:
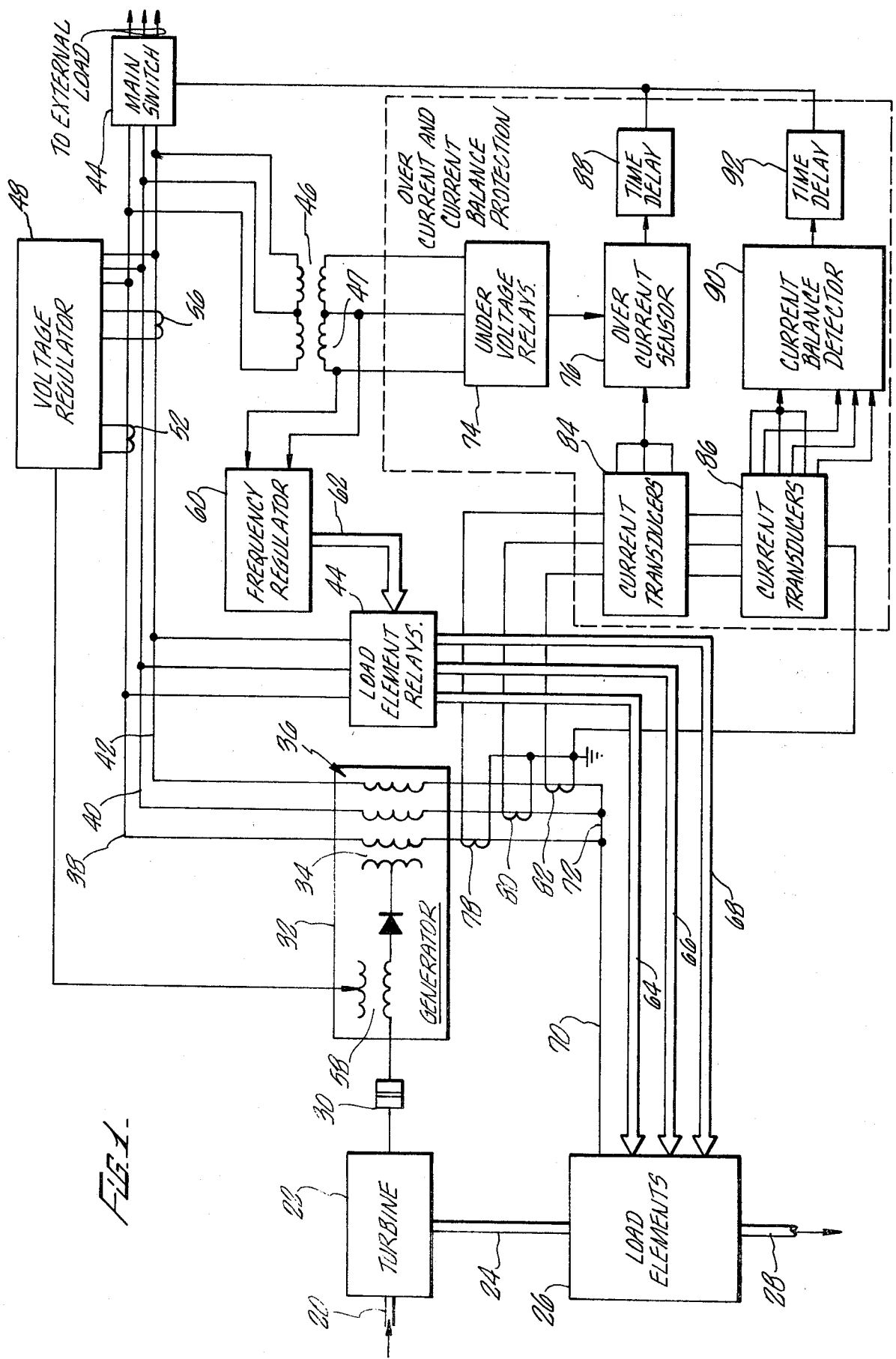
FIG. 1 is a block diagram of a hydroelectric power generating apparatus employing the devices of the present invention.

With reference now to FIG. 1., there is depicted a hydroelectric power generator apparatus employing the devices of the present invention. It will be appreciated by those skilled in the art that the hydroelectric apparatus of FIG. 1 is illustrative and that the present invention can be adapted to other suitable generating apparatus such as wind powered apparatus and the like where an uncontrolled variable mechanical input is used to provide electrical power to an external load.

The apparatus of FIG. 1 includes a conduit 20 through which a water flow is supplied to a turbine 22. The outflow from the turbine 22 is conducted by a conduit 24 to a plurality of load elements 26. The water flow through the load elements 26 is discharged through a conduit 28.

The load elements 26 are preferably of a type adapted to be disposed directly within the water flow and can be, for example, water heater elements.

The shaft from the turbine 22 is connected through a mechanical coupling 30 to a generator 32. The generator 32 is a brushless excitation synchronous type which includes a rotating field 34 and stationary three-phase armature windings 36 such as a type KAMAG manufactured by Kato Engineering having a rated power output of approximately 25 KW. The output of the armature windings 36 is applied along three conductors 38, 40 and 42 to an apparatus main switch 44. The main switch 44 can then in turn be connected to an external load. The conductors 38, 40 and 42 represent the first, second and third phases respectively.

The conductors 38, 40 and 42 are individually connected to a plurality of load element relays 44, to a potential transformer 46, and to a voltage regulator 48. Two current transformers 52 and 56 detect the current flowing through the conductors 38 and 42 and are connected to the voltage regulator 48. The voltage regulator 48, in response to the first, second and third phase voltages on the conductors 38, 40 and 42 and the first and third phase currents on the conductors 38 and 42, provides excitation control to an exciter 58 within the generator 32 to thereby control the output voltage of the generator 32. The voltage regulator 48 can be, for example, a voltage regulator such as that supplied with the KAMAG-type generator as described above.

One secondary winding 47 of the transformer 46 is connected to a frequency regulator 60. The frequency regulator 60 provides a plurality of control signals via lines 62 to the load element relays 44. The relays 44, in response to these control signals, connect the conductors 38, 40 and 42 through a plurality of lines 64, 66 and 68 to the load elements 26. In the embodiment of FIG. 1, each of the conductors 38, 40 and 42 is connected to eight relays within the load element relays 44 and is in turn connected by the relays 44 to eight individual elements within the load elements 26. Thus, a total of twenty four relays and load elements within the load element relays 44 and the load elements 26 are provided for the three phases appearing on the conductors 38, 40 and 42. The load elements 26 are in turn connected through a conductor 70 to a phase neutral 72 of the generator 32 to limit the voltage requirements of the relays 44.

As is more fully described herein below with respect to FIG. 2, the frequency regulator 60 senses the output frequency of the generator 32 and compares this output frequency with a predetermined frequency bandwidth range. If the generator 32 frequency increases above the predetermined range, the regulator 60 generates control signals which are applied through the lines 62 to the relays 44 to connect the load elements 26 in groups of three to the respective conductors 38, 40 and 42. The increased load on the generator 32 represented by the load elements 26 tends to correct the generator 32 output frequency. If the generator 32 output frequency remains outside the bandwidth range or continues to increase, the frequency regulator 60 controls the relays 44 to apply additional groups of load elements 26 to the conductors 38, 40 and 42 until the generator 32 frequency has stabilized within the bandwidth range. Similarly, if the generator 32 output frequency decreases below the bandwidth range, the frequency regulator 60 removes control signals from the load element relays 44 to thereby disconnect load elements 26 in groups of three from the respective conductors 38, 40 and 42. The frequency regulator 60 continues to disconnect the load elements 26 until the output frequency of the generator 32 is again within the bandwidth range.

The frequency control accomplished by the regulator 60 is performed in response to the variations in input power supplied by the turbine 22 or for variations in the load connected to the generator 32 which primarily includes the external load applied to the main switch 44. Additionally, since the frequency regulator 60 responds to the output frequency of the generator 32 rather than to the generator 32 output current, the load elements 26 are applied to the generator 32 in response to true load or power changes at the output of the generator 32 rather than changes in the generator 32 current which may not necessarily be a true meausre of the load power.

With continued reference to FIG. 1, the secondary winding of the potential transformer 46 is connected to under voltage relays 74. The under voltage relays 74 sense the voltage between each combination of the conductors 38, 40 and 42 and provide an output signal to an over current sensor 76 when one or more of the voltages is less than a preset voltage limit. The preset voltage limit is determined by system design factors such as generator impedance, system impedance, and other protective devices that can be employed in the overall system and can be approximately sixty five percent of the nominal generator output voltage.

The secondary windings of three current transformers 78, 80 and 82 are connected through a first plurality of current transducers 84 and in turn through a second plurality of current transducers 86. The transformers 78, 80 and 82 provide an AC current for each phase to the transducers 84 and 86 which is proportional to the current flowing through the respective generator armature windings 36. The current transducer 84, in response to these signals, provide a full-wave rectified output for each phase, that is for each of the transformers 78, 80 and 82, which is substantially proportional to the instantaneous current in the respective phase. The current transducers 86 provide two such outputs for each respective phase. The outputs of the current transducers 84 are connected in parallel to the over current sensor 76. By connecting the current transducers 84 outputs in this way, the signal applied to the over current sensor 76 is substantially proportional to the maximum instantaneous current in the armature windings 36. The sensor 76 is in turn connected to a time delay 88 which applies a disconnect signal to the main switch 44.

Three outputs of the current transducers 86 corresponding to the current transformer 78, 80 and 82 are similarly connected in parallel and are applied to a current balance detector 90. The three remaining outputs from the current transducers 86, again corresponding to the transformers 78–82, are individually applied to the current balance detector 90. The output from the current balance detector 90 is applied to a time delay 92 similar to the time delay 88 and the output of the time delay 92 which applies a disconnect signal to the main switch 44.

The over current sensor 76, in response to the output from the current transducers 84, compares the signal representing the maximum current flowing through the armature windings 36 with a predetermined maximum current limit. When the signal and thus the current in the armature windings 36 exceeds this maximum limit and when the signal from the under voltage relays 74 indicates that an under voltage condition exists on the generator 32, the over current sensor 76 provides a signal to the time delay 88. After a suitable period of time, the time delay 88 provides a signal to the main switch 44 disconnecting the external load from the generator 32. The time periods of the time delays 88 and 92 are preferably selected to allow other protective devices that may be employed within the apparatus of FIG. 1 or that may be employed within the external load connected to the main switch 44 to operate. For example, in the illustrative version of FIG. 1, the period of the delays can be about one second and about five seconds for the time delays 88 and 92 respectively.

The current balance detector 90, in response to the parallel applied signals from the current transducers 86, determines the maximum peak current within the armature windings 36. The current balance detector 90 additionally determines the maximum peak current flowing within each of the armature windings 36 and compares these individual peak currents with the maximum peak current. When the maximum peak current exceeds any one of the individual armature winding peak currents by a predetermined amount, the current balance detector 90 generates an output signal to the time delay 92 which functions as previously described for the time delay 88. The current transducers 84, the over current sensor 76 and the current balance detector 90 are more fully described hereinafter with reference to FIGS. 8, 9 and 10 respectively.

Although a three-phase apparatus is described herein, the frequency regulator 60, the current transducers 84 and 86, and the over current sensor 76 can be adapted to single phase or polyphase systems having other than three phases. Also, the current balance detector 90 can similarly be adapted to polyphase systems with other than three phases.

Figure 2:
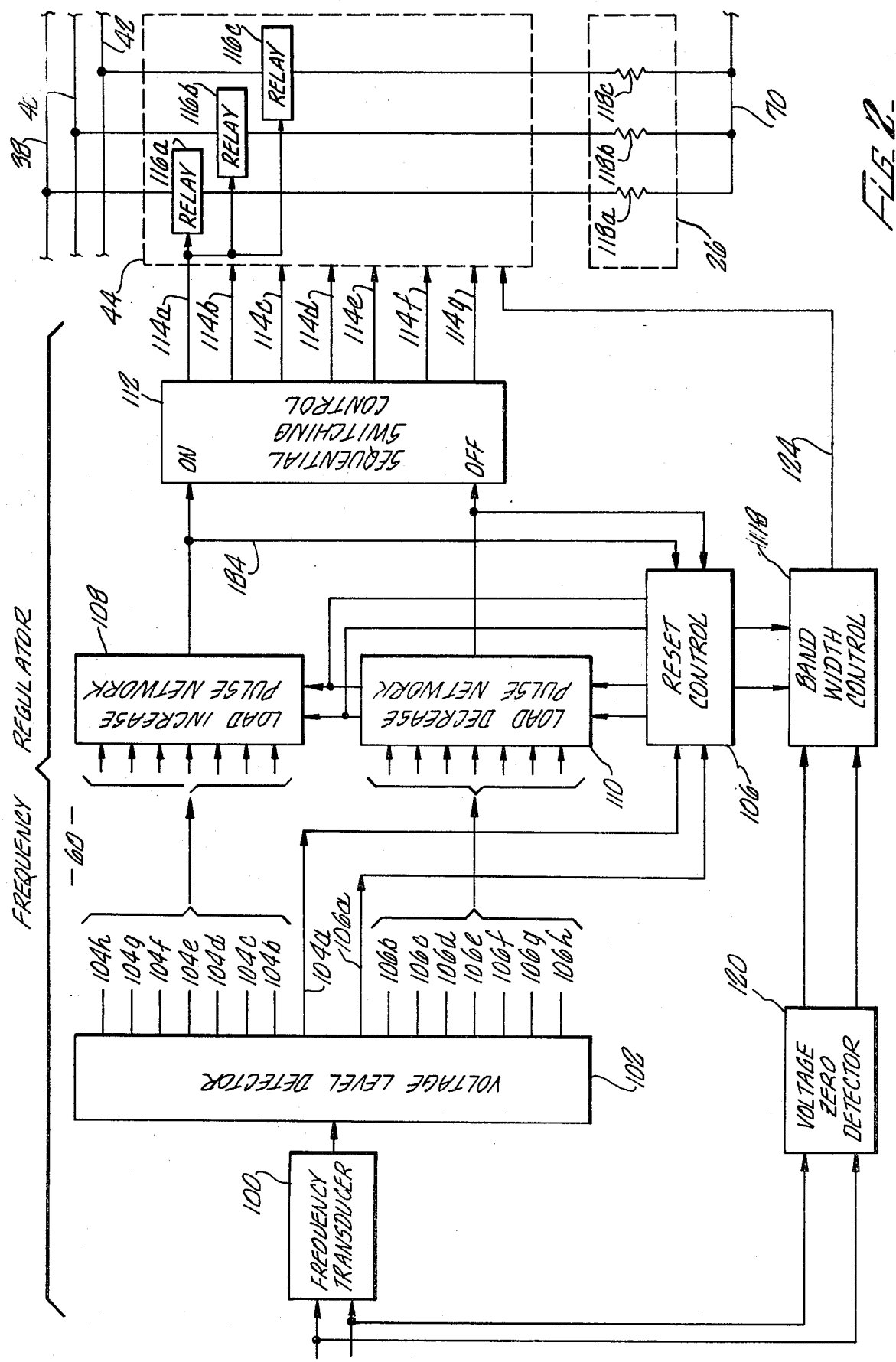
FIG. 2 is a block diagram of a preferred version of the frequency regulator of the present invention.

Turning now to FIG. 2, the frequency regulator 60 includes a frequency transducer 100 which receives the voltage output from the secondary 47 of the potential transformer 46 of FIG. 1. A current transducer 100 (FIG. 2), such as a model number 3750 available from Active Control Instrumentation, produces a DC output voltage proportional to the frequency of the input voltage. This output voltage can illustratively vary from 0 to 5 volts in response to an input frequency of fifty seven to sixty three Hz, respectively.

The proportional DC output from the frequency transducer 100 is applied to a voltage level detector 102 which converts the DC input voltage into a plurality of digital output signals. The voltage level detector 102 can include a plurality of comparators responsive to an accurate resistor voltage divider as is well known to those skilled in the art. With an output frequency of the generator 32 of approximately sixty Hz, the voltage level detector 102 outputs 104a–h provide high-level signals, while the outputs 106a–h provide low-level signals.

The outputs 104a–h transition from high-level signals to low-level signals for the generator 32 output frequencies above sixty Hz in 0.15 Hz steps, respectively. In a similar manner, the outputs 106a–h transition from low-level signals to high-level signals for generator output frequencies below sixty Hz in 0.15 Hz steps, respectively.

As the generator 32 output frequency increases to approximately 60.15 Hz, the output 104a transitions from a high-level signal to a low-level signal. The outputs 104b–h similarly transition at approximately 0.15 Hz steps as the generator 32 output frequency increases. The outputs 104a–h again transition from low-level signals to high-level signals as the generator frequency decreases below the respective frequency steps.

Similarly, the outputs 106a–h transition from low-level signals to high-level signals as the generator frequency drops below 60 Hz in 0.15 Hz steps, respectively, and again transition to lower-level signals as the generator 32 output frequency increases above the respective steps.

Thus the outputs 104a and 106a define a bandwidth range centered around a predetermined frequency within which none of the outputs 104 or 106 changes. However, beyond that bandwidth range which in the embodiment of FIG. 2 is approximately 0.3 Hz, at least one of the outputs 104 or 106 transitions from one signal level to another as described above. Although the voltage level detector 102 has been described for providing outputs which are generally related to equal changes in the generator 32 output frequency, the difference between the steps can be narrowed or widened or can be selected to be nonlinear according to, for example, the frequency variations and stability desired within the system. The bandwidth range and the number of outputs can be varied according to similar considerations.

The outputs 104a and 106a are applied to a reset control 106 and the outputs 104b–h are applied to a load increase pulse network 108 and a load decrease pulse network 110 respectively. The load increase pulse network 108 (FIG. 3) includes seven substantially identical pulse generators 150-162. The output signal 104b from the voltage level detector 102 is applied through an I terminal 163 to a Schmitt trigger inverter 164 and also through an RI terminal 166 of the generator 150 to an RO terminal 168 of the generator 152. The output of the inverter 164 is applied to the set input of a set-reset latch 170. A reset signal is applied to the reset input of latch 170 is applied through an RO terminal 171 from the reset control 106 (FIG. 2) as will be described below. The output of the latch 170 is applied to an inverter 172 and to a counter 174 such as a type MC 14490 contact bounce eliminator. The counter 174 provides an output to a two-input NOR gate 176 which has the same polarity as the input from the counter 174 but which is delayed from the input by a time that is determined by the period of clock pulses applied to the counter 174 through a C terminal 178 of the generator 150. The output of the inverter 172 is connected to the second input of the gate 176. The output of the gate 176 is connected through a Q terminal 179 to one input of a four-input OR gate 180 which is connected to one input of a two-input OR gate 182.

The remaining generators 152-162 contain circuitry substantially similar to that of the generator 150 and each Q terminal from the generators 152 and 154 is connected to two-inputs of the gate 180. The remaining input to the gate 180 is supplied via a line 372 from the reset control 106 as is described with reference to FIG. 6. The Q terminal of the generators 156-162 are connected to the four-inputs of an OR gate 184 which is in turn connected to the second input of the gate 182. The output of the gate 182 is connected to a sequential switching control 112 (FIG. 2) through a line 264 and to the reset control 106 through a line 186.

In operation, the load increase pulse network 108 (FIG. 3) provides an output pulse from the gate 182 only for sequential transitions of outputs 104b–h from high-level signals to low-level signals, that is, for increasing frequency output from the generator 32. No pulses are generated when a frequency stabilizes or when the frequency decreases. More particularly, as the generator 32 output frequency increases from sixty Hz, the output 104a (FIG. 2) first transitions and the signal from the reset control 106 applied to the RO terminal 171 (FIG. 3) of the pulse generator 150 is removed. If the generator 32 frequency continues to increase to, for example, approximately 60.3 Hz, the output 104b transitions from a high-level to a low-level. Furthermore, when the output 104b becomes a low-level signal, the invertor 164 provides a set input to the latch 170 which provides a signal to the inverter 172 causing the gate 176 to generate a high-level output at the Q terminal 179. The output of the latch 170 also enables the counter 174 which, after a length of time determined by the clock pulse frequency, generates a high-level output to the gate 176, thus causing the output of the gate 176 to become a low-level signal. In this way, the gate 176 produces a pulse at the Q terminal 179 of the generator 150 when the generator 32 output frequency increases from 60 Hz to approximately 60.3 Hz.

When the generator 32 output frequency decreases to a frequency such that the output 104b transitions to a high-level signal, the inverter 164 removes the set input from the latch 170. However, the latch 170 remains set and, if the generator 32 output frequency again increases to approximately 60.4 Hz, such that the output 104b again transitions to a low-level signal, the latch 170 in combination with the invertor 172, the counter 174 and the gate 176 does not produce a pulse at the Q terminal 179 of the network 150.

When the generator 32 output frequency decreases below approximately 60.15 Hz such that the output 104a (FIG. 2) transitions to a high-level signal, than the signal from the reset control 106 applied through the RO terminal 171 to the latch 170 resets the latch 170, enabling the pulse generator 150 to again generate a pulse output when the generator 32 output frequency increase above approximately 60.3 Hz as described above.

Thus the pulse generator 150 provides an output pulse when the output 104a and 104b (FIGS. 2 and 3) transition from a high-level signal to a low-level signal, that is, as the generator 32 output frequency increases from less than 60.15 Hz to greater than 60.3 Hz. However, once the generator 150 has produced an output pulse, both the outputs 104a and 104b must again transition to high-level signals, thereby resetting the latch 170 and thus resetting the generator 150. In this way, the generator 150 provides an output pulse only for increasing output frequency of the generator 32 and only when the outputs 104a and 104b sequentially transition from high-level signals to low-level signals, thus indicating generally increasing generator 32 output frequency.

The remaining pulse generators 152-162 are implemented substantially similarly to the generator 150. In this way, the generators 150-162 when taken together provide output pulses only for generally increasing generator 32 output frequency. If the generator 32 output frequency should decrease, each of the generators 150-162 provides an output pulse only after the generator 32 output frequency has decreased sufficiently to reset the network and then has increased again causing at least two of the respective outputs 104a-104h to sequentially transition.

The load decrease pulse network 110 operates in a manner similar to that of the load increase pulse network 108. However, the network 110 instead provides output pulses for decreasing generator 32 output frequency which causes the outputs 106a-106h (FIG. 2) to sequentially transition from low-level signals to high-level signals.

Figure 3:
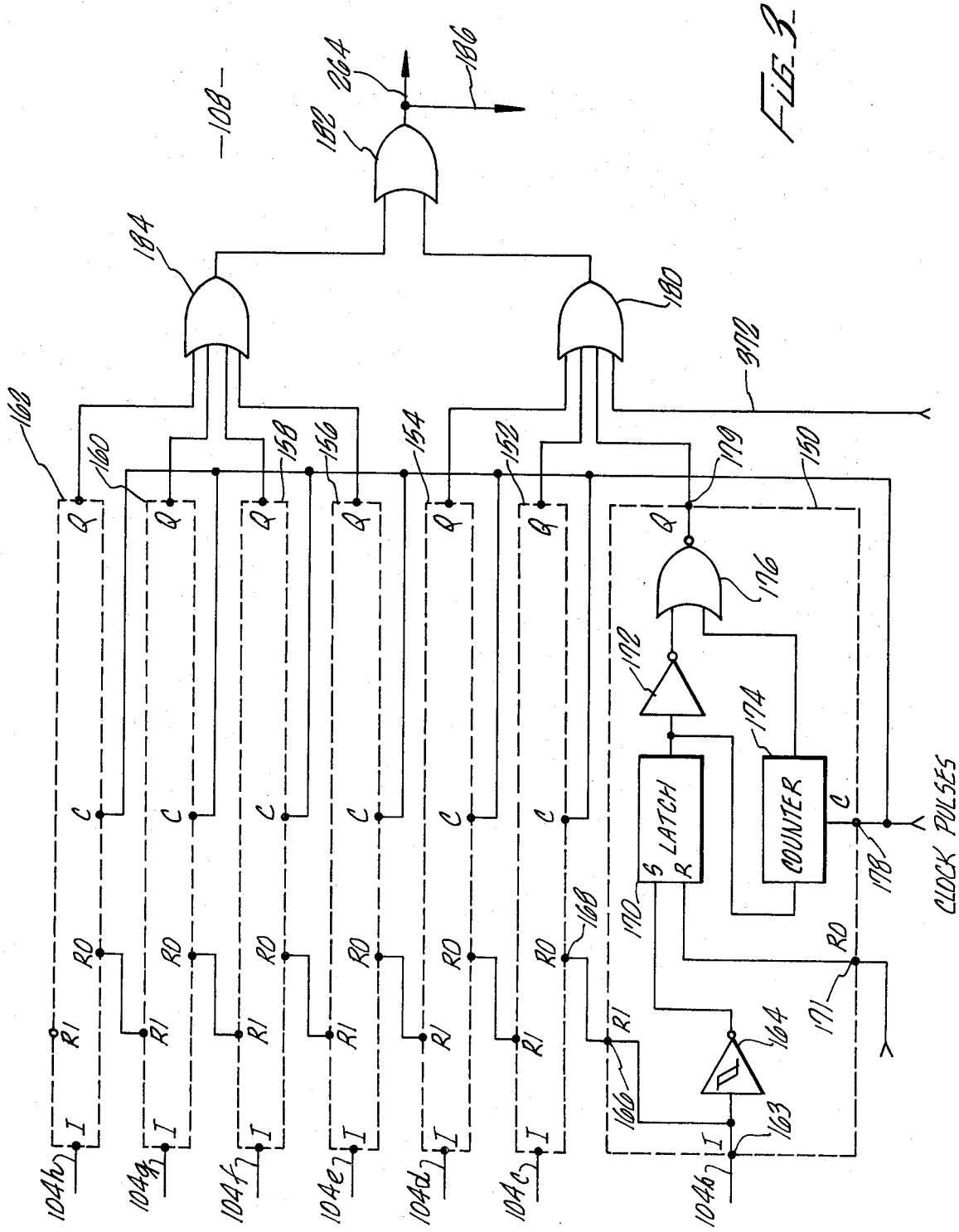
FIG. 3 is a schematic diagram of the load increase pulse network of FIG. 2.

The load decrease pulse network 110 (FIG. 4) includes seven pulse generators 204-216. These generators 204-216 are generally similar to the generators 150-162 of the load increase pulse network 108 (FIG. 3). However, the networks 204-216 include an additional inverter 218 between a Schmitt trigger inverter 220 and a set input of a set-reset latch input 222. The inverter 220 and the latch 222 correspond generally to the inverter 164 and the latch 170 of FIG. 3. Additionally, the output of the inverter 220 is connected through an RI terminal 224 of the generator 204 to an RO terminal 226 of the generator 206. The reset signal on a line 200 from the reset control 106 is substantially the inverted logic level of the output 106a.

When the generator 32 output frequency decreases so as to cause the outputs 106a and 106b to transition from low-level signals to high-level signals, the reset signal on the line 200 first transitions to a low-level and then the output 106b transitions to a low-level signal. This causes the latch 222 to be set and to thus generate an output pulse at a Q terminal 228 of the pulse generator 204. The pulse generator 204 does not produce another output pulse until the generator 32 output frequency increases to cause both the output signals 106a and 106b to transition to low-level signals, thus resetting latch 222. Then, when the generator 32 output frequency again decreases so as to sequentially transition the signal levels of the outputs 106a and 106b, the generator 204 again provides an output pulse.

The remaining generators 206-216 are similar to the generator 204. The generators 204-216 and a signal on a line 202 are applied through OR gates 230, 232 and 234 to provide the output for the load decrease pulse network 110 through a line 266 and to the reset control 106 via a line 236. Thus, as the generator 32 output frequency decreases, the network 110 provides an output pulse in response to sequential low-level to high-level transitions of the signals on the outputs 106b-106h.

The sequential switching control 112, in response to the pulses from the load increase pulse network 108 and the load decrease pulse network 110 controls the relays within the load element relays 44 (FIG. 2). The sequential switching control 112 generates control signals on lines 114a-114g. Each of the lines 114a-114g is in turn connected to a group of three relays. For example, the line 114a is connected to a group of three relays 116a-116c. Each group of three relays within the load element relays 44 in turn connects the conductors 38, 40 and 42 to a group of three load elements 118a-c within the load elements 26. Thus the relays 116a-116c, when controlled by the control signal on the line 114a, connect the conductors 38, 40 and 42 to the three load elements 118a, 118b and 118c.

Each of the lines 114b-114g are similarly connected to a group of three relays of the load element relays 44 which, in response to the signals appearing on lines 114b-114g, connect the conductors 38, 40 and 42 to respective groups of three elements of the load elements 26. The relays within the load element relays 44 are preferably solid state relays that switch is at 0 voltage to thereby substantially prevent the production of harmonics and electromagnetic interference.

The sequential switching control 112 includes a plurality of switching circuits 250-262 (FIG. 5) which generates the control signals on the lines 114a-114g, respectively. The switching circuits 250-262 operate to sequentially provide control signals on the lines 114a-114g in response to pulses from the load increase pulse network 108 which are applied to the circuits 250-262 via the line 264. Similarly, the circuits 250-264 operate to remove control signals from the lines 114a-114g in a reverse sequence in response to pulses from the load decrease pulse network 110 via the line 266.

Each of the switching circuits 250-262 is similar and includes an A terminal 268 which receives the pulse from the line 264 and provides the pulse to an AND gate 270. An AA terminal 272 is connected to a second input of the gate 270 and is adapted to provide an ON enable signal to the gate 270. The output of the gate 270 is connected to the set input of a set-reset latch 274.

The switching circuit 250 further includes a B terminal 276 which is adapted to receive the pulses from the line 266 and applies the pulses to an AND gate 278. A second input of the gate 278 is connected to a BB terminal 280 which is adapted to receive an OFF enable signal. The output of the gate 278 is connected to the reset terminal of the latch 274. The output of the latch 274 is applied through a buffer 282 to a Q terminal 284 of the circuit 250. The Q terminal 284 is in turn connected to the line 114a and to the relays 116a-116c of the load element relays 44 (FIG. 2).

The output of the latch 274 (FIG. 5) is also applied to a counter 286 which is similar to the counter 174 of FIG. 3. The output of the counter 286 is connected to an inverter 288 which generates an OFF enable signal that is applied to a DR terminal 290. An oscilator 292 provides the clock pulses for the counter 286 through a C terminal 294. The output of the counter 286 also supplies an ON enable signal to a DS terminal 296.

Figure 5:
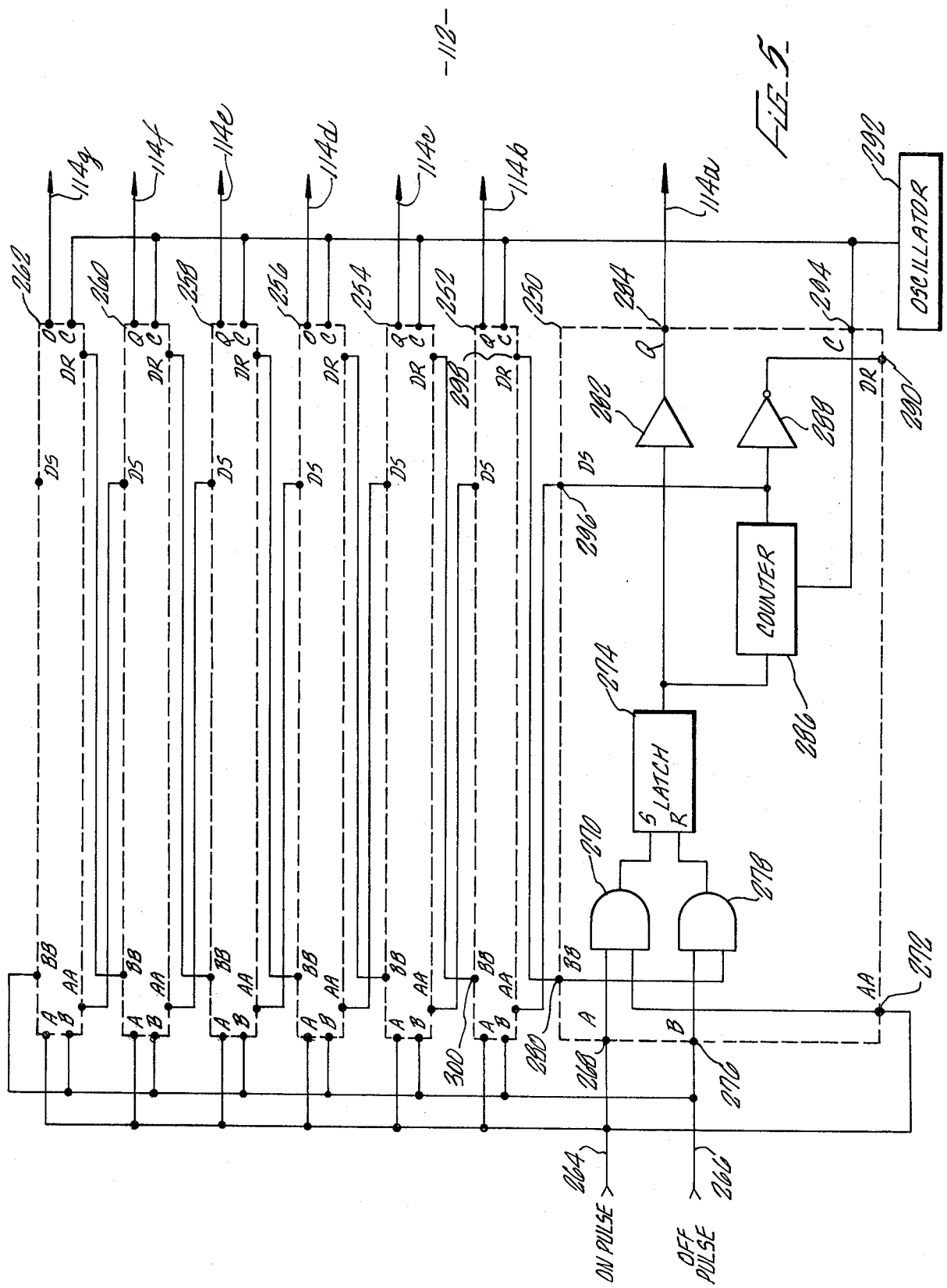
FIG. 5 is a schematic diagram of the sequential switching control of the preferred version of FIG. 2.

The operation of the switching circuits 250-262 and in particular the switching circuit 250 will now be described with reference to FIG. 5. Initially, none of the circuits 250-262 is providing control signals on the lines 114a-114g. When a pulse on the line 264 is received from the load increase pulse network 108, the pulse is applied to both inputs of the gate 270 through the A terminal 268 and through the ON enable signal terminal AA 272. Thus the gate 270 provides a set signal to the latch 274. The latch 274 and the buffer 282 provide the control signal via the line 114a to the relays 116a-116c (FIG. 2), thus applying power from the conductors 38, 40 and 42 to the load elements 118a-118c respectively.

The counter 286 (FIG. 5), in response to the output signal from the latch 274, provides an ON enable signal to the DS terminal 296 after a predetermined delay. The frequency of the oscillator 292 and thus delay of the counter 286 is adjusted to provide a delay from the counter 286 which is approximately twice as long as the pulse appearing on the line 264 to ensure that the pulse on the line 264 is removed before the counter 286 generates an output. The output from the counter 286 also removes the OFF enable signal generated by inverter 288 from the DR terminal 290.

Since the circuit 252 is substantially similar to the circuit 250, the ON enable signal provided by the counter 286 allows the circuit 252 to generate a control signal on the line 114b with the next pulse appearing on the line 264. This process is repeated for the remaining circuits 254–262, thereby sequentially applying control signals to the lines 114c–114g and thus applying additional load elements to the conductors 38, 40 and 42 of FIG. 2.

When only the switching circuit 250 is providing an output signal, and since the circuit 252 is substantially similar to the circuit 250, the circuit 252 provides a OFF enable signal from the DR terminal 298 to the BB terminal 280 of the circuit 250. This signal enables the gate 278 to respond to pulses on the line 266. Thus when a pulse on the line 266 is applied to the gate 278, the latch 274 is reset, removing the control signal from the line 114a.

Furthermore, when circuits 250 abd 252 are providing control signals to the load elements 44 along the lines 114a–114b, the switching circuit 250 does not respond to a pulse on the line 266, since the OFF enable signal at the BB terminal 280 is no longer provided by the circuit 252. Instead, the circuit 254 provides an OFF enable signal to a BB terminal 300 of the circuit 252, thereby allowing the circuit 252 to remove the control signal from the respective line 114b. This then removes the corresponding group of three load elements within the load elements 26 from the conductors 38, 40 and 42. Thus the circuits 250–262 operate to remove control signals from the load element relays 44 in a sequence that is the reverse order of that in which the control signals were applied, that is, the control signals will be removed sequentially from the lines 114g–114a.

The reset control 106 (FIG. 2) provides pulses to the load increase pulse network 108 or the load decrease network 110 when the frequency of the generator 32 output remains outside the bandwidth range established by the outputs 104a and 106a. These pulses are in turn applied to the sequential switching control 112 which applies or removes groups of load elements within the load elements 26 from the conductors 38, 40 and 42.

Figure 6:
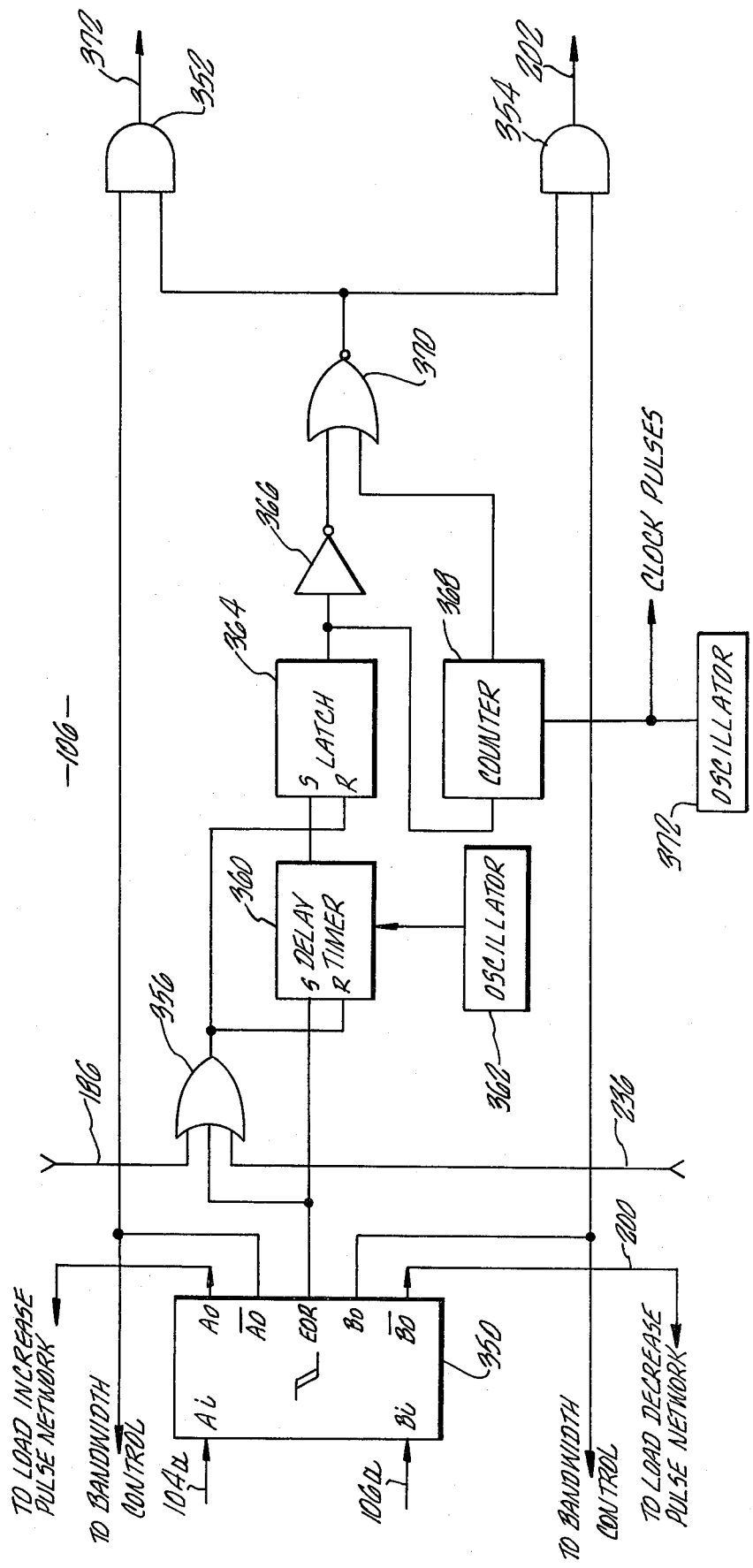
FIG. 6 is a schematic diagram of the reset control of FIG. 2.

With reference now to FIG. 6, the outputs 104a and 106a are applied to the Ai and Bi inputs of a dual Schmitt trigger 350 such as a type MC 14583. The Schmitt trigger 350, as is well known in the art, provides outputs for relatively precise input signal levels applied to the Ai and Bi inputs. The Ao output of the trigger 350 is the same logic lever as the input Ai while the inverted or bar Ao output provides an inverted output with respect to the input Ai. The Bo and the inverted Bo outputs are similarly related to the Bi input.

Figure 4:
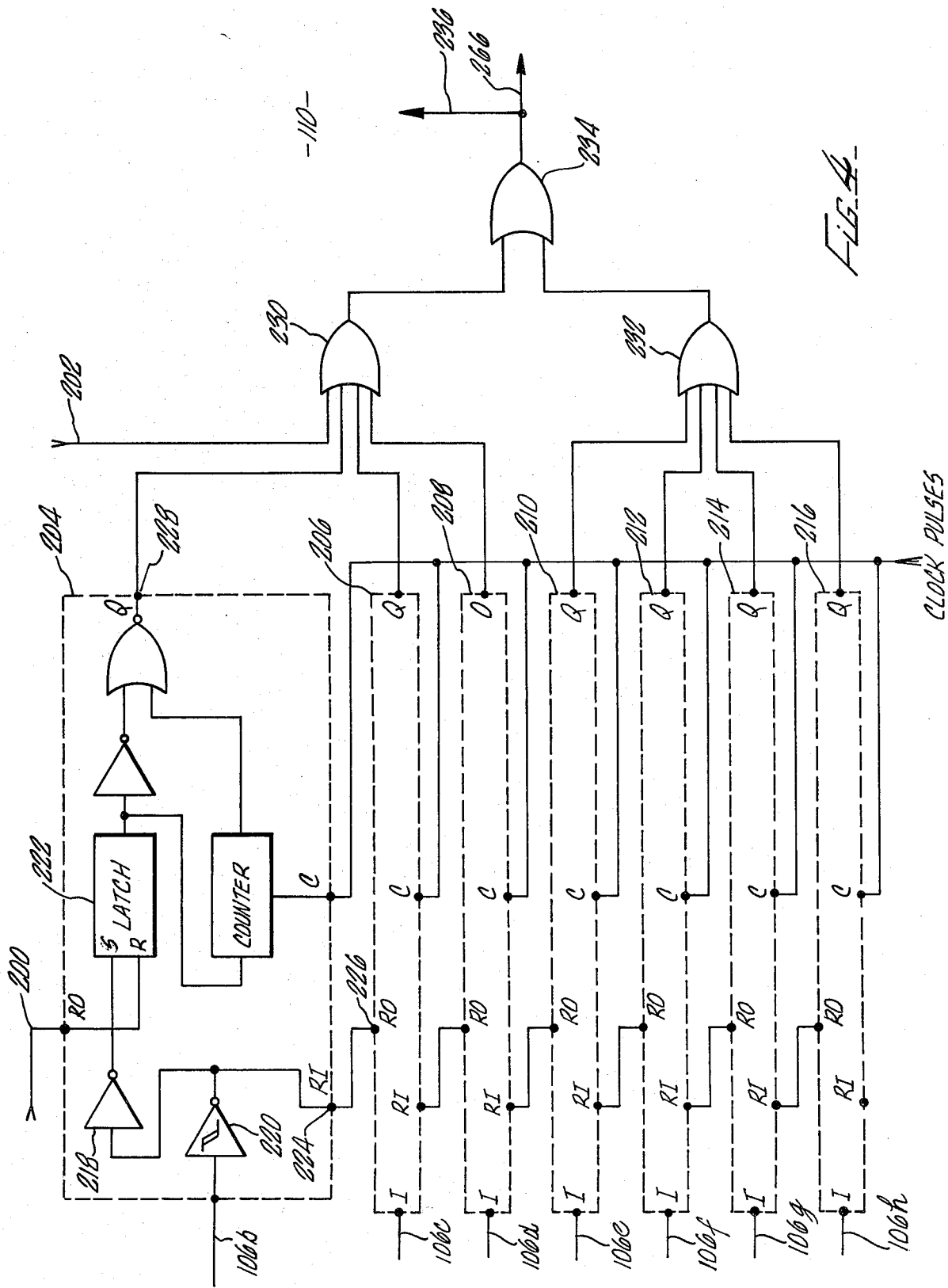
FIG. 4 is a schematic diagram of the load decrease pulse network of FIG. 2.

The Ao output of the trigger 350 provides the reset signal to the RO terminal 171 of the generator 150 (FIG. 3). Similarly, the inverted Bo output of the trigger 350 applies the reset signal via the line 200 to the reset terminal of the latch 222 of the generator 204 (FIG. 4). The inverted Ao output is connected to one input of an AND gate 352 and is also applied to a bandwidth control 118 (FIG. 2) which is described with reference to FIG. 7. The Bo output of the trigger 350 is similarly applied to the bandwidth control 118 and is also applied to one input of an AND gate 354.

The trigger 350 also provides an exclusive OR function at the EOR output which is connected to one input of an OR gate 356 and is applied to the set input of a delay timer 360. The delay timer 360 may be of a type MC 14541 and provides an output signal after a resettable delay. The output of the gate 356 is connected to the reset terminal of the timer 360. An adjustable oscillator 362 provides clock pulses to the timer 360. The frequency of the oscillator 362 can be adjusted to vary the delay of the timer 360 which in a preferred embodiment as shown in FIG. 6 can be approximately one second. The length of the delay determines how long the generator 32 output frequency can be outside the bandwidth range before the reset control 106 generates output pulses from the gates 352 and 354 as is described below.

The output of the timer 360 is provided to a set input of a set-reset latch 364 and the output of the gate 356 is also connected to the reset terminal of the latch 364. The output of the latch 364 is connected to an inverter 366 and to a counter 368. The outputs of the inverter 366 and the counter 368 are in turn applied to the input of a NOR gate 370, the output of which is connected to the second input of the gates 352 and 354. The latch 364, counter 368, inverter 366 and gate 370 generate a pulse in a manner substantially similar to that of the latch 170, (FIG. 3) counter 174, inverter 172 and gate 176 of the generator 150 as previously described. An oscillator 372 provides clock pulses to the counter 368 and clock pulses to the load increase pulse network 108, the load decrease pulse network 110, and the bandwidth control 118.

With continued reference to FIG. 6, when the generator 32 output frequency is within the bandwidth range defined by the outputs 104a and 106a of the voltage level detector 102 (FIG. 2), the trigger 350 provides an exclusive OR function at the EOR output having a high-level signal to the gate 356 and the timer 360, resetting the timer 360 and the latch 364. However, when the generator 32 output frequency increases causing the output 104a to transition from a high-level signal to a low-level signal, the EOR output of the trigger 350 generates a low-level signal which sets or enables the counter 360 and which removes the reset signal from the latch 364. When the frequency of the generator 32 does not return to the bandwidth range within the delay period established by the timer 360, the timer 360 provides an output to the latch 364. The latch 364 along with the inverter 366, the counter 368 and the gate 370 provides an output pulse to the gates 352 and 354. With the output 104a at a low-level, the inverted Ao output of the trigger 350 provides a high-level signal to the gate 352. This enables the gate 352 to respond to the output of the gate 370 by providing an output pulse on a line 372 to an input of the gate 180 (FIG. 3). The gate 180 in turn generates an output pulse from the load increase pulse network 108 which is applied to the sequential switching control 112 (FIG. 2). In response to this pulse, the control 112 provides a control signal to the load element relay 44, thus connecting an additional group of loads elements within the elements 26 to the conductors 38, 40 and 42. The pulse from the gate 182

(FIG. 3) is applied by the line 184 to an input of the gate 356, thereby resetting the timer 360 and the latch 364. The circuitry continues to operate to provide additional pulses on the line 372 until the trigger 350 indicates that the generator 32 output frequency is within the bandwidth range.

The reset control 106 (FIG. 6) operates in a similar fashion to that just described when the generator 32 output frequency is less than the bandwidth range. The output 106a transition from a low-level signal to a high-level signal initates the timer 360 to then provide one or more pulses from the gate 354 via the line 202 (FIG. 4) to the gate 230 of the pulse network 110. The network 110 in turn provides a pulse along the line 236 to the gate 356, resetting the timer 360 and the latch 364 as previously described. The sequential switching control 112 (FIG. 2) in response to the pulses from the network 110 removes groups of load elements from the conductors 38, 40 and 42.

Thus the reset control 106 operates to provide pulses to the sequential switching control when the generator 32 output frequency remains outside the bandwidth range for a preset time interval and also provides various logic signals for use throughout the frequency regulator 60.

The frequency regulator 60 (FIG. 2) additionally includes a voltage zero detector 120 which is responsive to the secondary winding 47 of the potential transformer 46 (FIG. 1). The voltage zero detector 120 (FIG. 2) detects the negative-going and positive-going zero crossings of the applied signal and provides signals indicative of those crossings to the bandwidth control 118. The bandwidth control 118 in response to the signals and in response to the signals from the reset control 106 which indicate that the generator 32 output frequency is outside the bandwidth range generates a control signal on a line 124. The signal is supplied to an eighth group of relays within the load element 44 which in turn connect an eighth set of load elements within the load elements 26 to the conductors 38, 40 and 42. The control signal appearing on the line 124 is timed so that the eighth group of relays within the load element relays 44 connect an integral number of full cycles of output power of the generator 32 to the eight group of load elements. The integral number of full cycles of the output from the generator 32 prevents DC saturation within the generator 32 which might otherwise occur when the number of positive half cycles of alternating current do not equal the number of negative half cycles particularly where the load is often switched on or off as is the case with the load elements controlled by the bandwidth control 118.

The secondary winding 47 of the transformer 46 of FIG. 1 is connected to the voltage zero detector 120 (FIG. 7) through a parallel combination capacitor 400 and potentiometer 402 which provide for phase angle adjustment. The capacitor 400 and the potentiometer 402 are connected to the primary winding of a transformer 404. The transformer 404 includes a center-tapped secondary winding. Connected in series between the center tap and a first end terminal of the secondary winding is a current limiting resistor 406 and a voltage limiting Zener diode 408. The input of a Schmitt trigger inverter 410 is connected between the Zener diode 408 and the resistor 406. Similarly connected between the center tap and a second end terminal of the transformer 404 secondary winding is a series-connected resistor 412 and Zener diode 414. The input of a second Schmitt trigger inverter 416 is connected between the resistor 412 and the diode 414. At the end of the negative half-cycle of the voltage across the primary winding of the transformer 404, the input voltage to the trigger 416 becomes approximately zero, thus providing a high-level output signal from the inverter 416 which is applied to an inverter 418 and a counter 420. The outputs of the inverter 418 and the counter 420 are applied to the inputs of a NOR gate 422. In response to the signal from the inverter 416, the inverter 418, the counter 420 and the gate 422 provide a pulse to an input of an AND gate 424 and to an input of an AND gate 426.

At the end of the positive half-cycle of the voltage across the primary winding of the transformer 404, the inverter 410 similarly applies an input to an inverter 428, and a counter 430 which are in turn connected to a NOR gate 432. The gate 432 in response to the input from the inverter 410 provides an output pulse to an input of an AND gate 434 and to an input of an AND gate 436.

The gates 424, 426, 434 and 436 form a portion of the bandwidth control 118 of FIG. 7. A second input of the gates 436 and 426 is connected to the inverted Ao output of the trigger 350 (FIG. 6) and a second input of the gates 434 and 424 is connected to the Bo output of the trigger 350. The output of the gate 436 is provided to the set input of a set-reset latch 438. The output of the gate 434 is applied to the reset input of the latch 438. The output of the latch 438 is connected to an input of an OR gate 440 and is also connected through an inverter 442 to a third input of the gate 426. The output of the gate 426 is similarly connected to the set input of a set-reset latch 444 and the output of the gate 424 is connected to the reset input of the latch 444. The output of the latch 444 is applied to a second input of the gate 440 and it is also applied through an inverter 446 to the third input of the gate 436.

The output of the gate 440 is applied through a buffer 448 to the line 124 and in turn to the load element relays 44 (FIG. 2) to thereby provide the control signal for the eighth load relay group. As described above, the relays responsive to the control signal on the line 124 are preferably solid state relays which connect or disconnect the generator 32 output to the respective load element 26 at zero voltage.

When the generator 32 output frequency increases and thus causes the output 104a (FIG. 2) to transition from a high-level to a low-level, the trigger 350 (FIG. 6) generates a high-level signal at the inverted Ao output which is applied to the gates 436 and 426 (FIG. 7). When, for example, the voltage across the primary winding of the transformer 404 next generates a pulse from the gate 422, the gate 426 applies a set pulse to the latch 444 which in turn provides a signal through the gate 440 and the driver 448 to the line 124. The output from the latch 444 applied through the inverter 446 inhibits the operation of the gate 436 and thus inhibits the operation of the latch 438. The control signal applied along the line 124 enables the solid state relays to switch on the respective load elements with the next zero crossing of the respective generator phases appearing on the conductors 38, 40 and 42.

When the generator 32 output frequency decreases in response to the additional load, the output frequency reaches the bandwith range lower limit established by the output 106a (FIG. 2) which in turn causes the output 106a to transition from a low-level signal to a high-level signal. The Bo output of the trigger 350 (FIG. 6)

then provides a high-level signal to the gates 424 and 434 of FIG. 7. The latch 444 is then reset by the output of the gate 422 but through the gate 424. Thus the latch is set and reset by the output pulses from the gate 422 which are precisely related to the same voltage point on the sine wave voltage input applied to the primary winding of the transformer 404. The latch 444, when reset, removes the control signal from the line 124 and the solid state relays in response thereto remove the associated load elements 26 from the conductors 38, 40 and 42 at the next zero voltage crossings of the respective phases.

The zero voltage detector and the bandwidth control 120 and 118 of FIG. 7 operate similarly for pulse outputs from the gate 432. In this way the zero voltage detector 120 and the bandwidth control 118 operate to maintain the generator 32 output frequency within the predetermined bandwidth by applying an integral number of full cycles of each generator 32 phase output on the conductors 38, 40 and 42 to the respective load elements 26.

The frequency regulator 60 (FIG. 1) can also be used to synchronize the generator 32 to a power grid. For example, when the generator 32 output frequency is controlled by the frequency regulator 60 and is within the bandwidth range as described above, a small slip frequency can exist between the generator 32 output frequency and the frequency of the power grid. This small slip frequency then allows the phase of voltage of the generator and the phase of the voltage of the power grid to be compared. When the voltage phases are substantially equal, the generator 32 output can be connected to the power grid and the frequency regulator 60 can then be disabled to remove the load elements 26 from the conductors 38, 40 and 42. Similarly, when it is desired to remove the generator 32 output from the power grid, the frequency regulator 60 can be enabled to control the generator 32 output frequency once the disconnect is made.

Turning now to a description of the over current and current balance protection circuitry of FIG. 1, the current transducers 84 and 86 each can include three current transducer modules such as the module 449 shown in FIG. 8. The primary winding of a transformer 450 is connected in series with the secondary winding of the respective current transformer 78, 80 or 82. The secondary winding of the transformer 450 is connected across a varistor 452, a potentiometer 454, and two bridge rectifiers 456 and 458. Each of the bridge rectifiers 456 and 458 provide a full-wave rectified output which is substantially proportional to the instantaneous current sensed by the associated current transformer 78, 80 or 82. The varistor 452 provides surge protection for the current transducer circuitry. In the version of FIG. 1, three of the current transducer modules 449 of FIG. 8 are employed in each of the current transducers 84 and 86, one for each of the respective current transformers 78, 80 or 82. The outputs from the rectifiers 456 for the modules 449 in the current transducers 84 are connected in parallel and are applied to the over current sensor 76.

With respect to FIG. 9, these parallel connected outputs are applied through a resistor 500 and to a parallel-connected potentiometer 502 and a surge protection zenor diode 504. A hybrid relay 506 is also connected across the potentiometer 502.

The relay 506 (FIG. 9A) is preferably a hybrid relay employing a relatively sensitive solid state input driver 507a which drives a coil 507b to thereby control a reed switch 507c having normally open contacts 508. The DC power for the over current sensor 76 is provided to terminals 510 and 512 from the under voltage relays 74 (FIG. 1) when one of the relays 74 senses that an under voltage condition exists on the generator 32.

The relay 506 (FIG. 9) senses the voltage across the pontentiometer 502 and closes the contacts 508 when the voltage reaches a predetermined limit corresponding to a maximum current in the armature windings 36. This limit is adjusted by adjusting the pontentiometer 502. Although the relay 506 provides an inexpensive, sensitive and high-speed means for detecting this limit, other suitable means such as solid state comparators and photoisolators can be similarly employed. Thus, the contacts 508 are closed when any one of the voltage outputs from the current transducers 84 exceeds the predetermined limit, that is, whenever the current flowing in any one of the armature windings 36 exceeds the predetermined maximum value. Since these maximum values can only momentarily exist, the output of the contact 508 is a series of monentary contact closures.

The output of the contact 508 is applied through a pulse extender 514 which insures that the output of the over current sensor 76 is continuously provided when an over current condition exists in any one of the armature windings 36. The pulse extender 514 includes a resistor 516 connected in a series to the contacts 508 and a blocking diode 518. The diode 518 is connected to a Zener diode 520, a potentiometer 522, a capacitor 524 and to an input terminal of a second hybrid relay 526. The second input terminal of the relay 526 is connected to the remaining terminals of the Zener diode 520, potentiometer 522 and capacitor 524. The diode 520 provides a limit for the maximum voltage that can be developed across the capacitor 524 and the potentiometer 522 is adjustable to thereby adjust the discharge rate of the capacitor 524.

In operation, when the contacts 508 are closed and when the under voltage relay 74 provides power to the terminals 510 and 512, current is provided through the resistor 516 and the diode 518 to charge the capacitor 524. When the contacts 508 open, the capacitor 524 tends to discharge through the potentiometer 522. The charge on the capacitor 524 in response to the closeure of the contact 508 is sufficient to operate the relay 526 to close relay contacts 528 for a period of time that is about one and one-half times the period of the full wave rectified signal from the current transducers 84. In this way, the relay 526 provides a continuous output from the contacts 528 in response to momentary closures of the contact 508. However, the pulse extender 514 quickly causes the contact 528 to open once the currents within the armature windings 36 fall below the predetermined peak level and thus the over current sensor 76 resets substantially more quickly than previously known electromechanical current sensing devices.

In the version of FIG. 1, the over current sensor 76 is operated under the control of the under voltage relay 74 to thus provide a voltage supervised over current protection function. However, the over current sensor 76 can be continuously operated in response to the current transducers 84 to provide a high-speed, fast reset over current protection device.

Turning now to a description of the current balance detector 90, the outputs of the rectifiers 456 for the modules 449 in the current transducers 86 (FIGS. 1 and 8) are connected in parallel and are in turn connected to terminals 550 and 552 (FIG. 10) of the current balance detector 90. The signal at the terminal 550 is applied through a blocking diode 554 and a resistor 556 to a capacitor 558, a resistor 560, and a over voltage protection Zener diode 562. The capacitor 558 and the resistor 560 are connected in parallel and are in turn connected to the terminal 552. The common connection between the resistor 556, the resistor 560, the capacitor 558 and the Zener diode 562 is in turn connected to a first input terminal of a hybrid relay 566. The power for the relay 566 is provided by means of the terminals 567.

The second outputs of the rectifiers 456 for the modules 449 in the current transducers 86 (FIGS. 1 and 8) are individually connected to the terminal pairs 568-570, 572-574, and 576-578 (FIG. 10). The terminal pair 568-570 is connected to a charging circuit which includes a resistor 580 connected to the terminal 568. The resistor 580 is in turn connected to a capacitor 582, a resistor 584, and to the cathode of a diode 586. The resistor 584 is then connected to the anode of a diode 588, the cathode of which is connected to the second terminal of the capacitor 582 and to the terminal 570. The full-wave rectified input signal from the current transducers 86 which is applied to the terminal pair 568-570 charges the capacitor 582 through the resistor 580. The ohmic value of the resistor 584 is approximately three to five times greater than the value of the resistor 580 and thus the capacitor of 582 sustains a charge voltage across the resistor 584 which substantially corresponds to the peak voltage of the signal applied to the terminal pair 586-570. Thus the voltage across the resistor 584 is substantially proportional to the peak current in the associated generator phase.

Each of the terminal pairs 572-574 and 576-578 is connected to a similar charging circuit each having output resistors 590 and 592 similar to the resistor 584 and blocking diodes 594 and 596 similar to the diode 586. Diodes 598 and 600 correspond to the diode 588. The anodes of the diodes 586, 594 and 596 are connected together and are connected to the second input terminal of the relay 556 and to the anode of the protection Zener diode 562. The terminals of the resistors 584, 590 and 592 connected to the diodes 588, 598 and 600 are connected together and are then connected to the capacitor 558 and the resistor 560.

The voltages developed across the resistors 584, 590 and 592 are connected in opposing polarity to the voltage developed across the resistor 560. Thus, when the difference between the voltage across any one of the resistors 584, 590 and 592 and the voltage across the resistor 560 exceeds a predetermined amount, the relay 566 closes the contact pair 598, thereby providing a current imbalance output. The blocking diodes 586, 594 and 596 insure that the voltages across the resistors 584, 590 and 592 are individually compared to the voltage across the resistor 560.

In this way the current balance detector 90 provides an output by means of the contact pair 598 when the peak current flowing within any one of the armature windings 36 exceeds a predetermined difference between the maximum peak current flowing within the armature windings 36.

While an exemplary version of the invention has been described, it is to be understood that the invention is not limited to the details herein explained. It is expected that those skilled in the art will recognize numerous variations and equivalents which come within the spirit of the appended claims and which are intended to be included therein.

I claim:

1. A method for regulating the frequency of an alternating current generator which is adapted to receive input mechanical power from a prime mover and which is adapted to provide output power to a variable remote load and to a controlled load, including the steps of:
   determining the frequency of the generator output;
   comparing the generator output frequency to a predetermined nominal frequency, said nominal frequency being fixed within a predetermined bandwidth range having an upper limit and a lower limit, the upper and lower limits being fixed with respect to generator output voltage, and
   adjusting the power consumed by the controlled load by increasing the power consumption when the generator output frequency reaches said upper limit and by decreasing the power consumed by the controlled load when the generator output frequency reaches said lower limit, to thereby maintain the generator output frequency substantially at the nominal frequency within said predetermined bandwidth, said adjusting of the controlled load being after a predetermined applied time interval when the generator output frequency is outside the bandwidth range.

2. A method as in claim 1 wherein the adjusting step further includes the step of adjusting the controlled load power consumption in proportion to the variation between the generator output frequency and the nominal frequency to thus stabilize the generator output frequency in response to imbalances between the input power and the output power.

3. A method for regulating the frequency of an alternating current generator which is adapted to receive uncontrolled variable input mechanical power from a prime mover and which is adapted to provide output power to an uncontrolled variable remote load and to a controlled load, including the steps of:
   detecting the generator output frequency,
   comparing the output frequency with first selected frequencies greater than a predetermined center frequency and second selected frequencies less than the center frequency, the first and second frequencies being fixed with respect to generator output voltage, and
   adjusting the controlled load power consumption when the generator output frequency varies with respect to the first selected frequencies in a first direction and when the generator output frequency varies in a second direction with respect to the second selected frequencies to thereby maintain the generator output frequency substantially within a bandwidth range having an upper limit and a lower limit, the comparing step including the step of comparing the generator output frequency with the bandwidth range upper and lower limits, and the adjusting step including the step of adjusting the controlled load after a predetermined applied time interval when the generator output frequency is outside the bandwidth range.

4. A method as in claim 3 wherein said first direction is increasing with respect to the center frequency and said second direction is decreasing with respect to the center frequency.

5. A method as in claim 4 wherein said adjusting step further includes the steps of
   incrementally increasing the controlled load power consumption when the generator output frequency varies in the first direction past each of the first selected frequencies, and incrementally decreasing the controlled load power consumption when the generator output frequency varies in the second direction past each of the second selected frequencies.

6. A device for regulating the frequency of an alternating current generator which is adapted to receive input mechanical power from a prime mover and which is adapted to provide output power to a variable remote load and to a controlled load, the controlled load being responsive to control signals, comprising means for determining the frequency of the generator output, means responsive to the frequency determining means for comparing the generator output frequency with a predetermined nominal frequency value, the predetermined nominal frequency value being within a bandwidth range having an upper limit and a lower limit, the upper and lower limits being fixed with respect to generator output voltage;

means responsive to the comparing means for generating the control signals for increasing the controlled load power consumption when the generator output frequency is above said upper limit and to decrease the power consumed by the controlled load when the generator output frequency reaches said lower limit to thus maintain the generator output frequency substantially within said bandwidth range;

timing means responsive to the comparing means for generating a predetermined time interval when the generator output frequency is outside said bandwidth range, and means responsive to the timing means for generating a control signal at the end of said time interval.

7. A device as in claim 6 wherein the device further includes means for generating control signals to adjust the power consumed by the controlled load in proportion to the variations between the generator output frequency and the nominal frequency to thereby substantially stabilize the generator output frequency in response to imbalances between input and output power.

8. A device for regulating the frequency of an alternating current generator which is adapted to receive input mechanical power from a prime mover and which is adapted to provide output power to an uncontrolled variable remote load and to a controlled load, the controlled load being responsive to control signals, comprising means for determining the output frequency of the generator output, means for comparing the output frequency with first selected frequencies greater than a predetermined center frequency and second selected frequencies less than the center frequency, the first and second selected frequencies being fixed with respect to generators output voltage, means for adjusting the controlled load power consumption when the generator output frequency varies with respect to the first selected frequencies in a first direction and when the generator output frequency varies in a second direction with respect to the second selected frequencies, wherein the first selected frequencies and said second selected frequencies define a bandwidth range, timing means responsive to the comparing means for generating a predetermined time interval when the generator output frequency is outside said bandwidth range, and means responsive to the timing means for generating a control signal at the end of said time interval.

9. A device as in claim 8 wherein the first direction is increasing with respect to the center frequency and the second direction is decreasing with respect to the center frequency.

10. A device as in claim 8 wherein the adjusting means further includes means for incrementally increasing the controlled load power consumption when the generator output frequency varies in the first direction and for incrementally decreasing the controlled load power consumption when the generator output frequency varies in the second direction.

11. The invention of claims 1, 3, 6 or 8 wherein the prime mover is a water driven turbine responsive to a water flow and the controlled load is disposed within at least a portion of the water flow.

* * * * *